US010664797B2

(12) United States Patent
Chappell et al.

(10) Patent No.: US 10,664,797 B2
(45) Date of Patent: May 26, 2020

(54) DISTRIBUTED LEDGER CERTIFICATION

(71) Applicant: Amazon Technologies, Inc., Seattle, WA (US)

(72) Inventors: Gregory Louis Chappell, Luxembourg (LU); Rui Filipe Lopes Joaquim, Sandweiler (LU); Anselmo Talotta, Luxembourg (LU); Hakan Bahcivanci, Luxembourg (LU); Ana Paula Ribeiro Atayde, Bertrange (LU)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 15/653,948

(22) Filed: Jul. 19, 2017

(65) Prior Publication Data

US 2019/0026685 A1   Jan. 24, 2019

(51) Int. Cl.

| G06Q 10/08 | (2012.01) |
| G06Q 30/00 | (2012.01) |
| G06Q 30/02 | (2012.01) |
| H04L 29/06 | (2006.01) |
| H04L 9/32 | (2006.01) |
| G06Q 30/06 | (2012.01) |

(Continued)

(52) U.S. Cl.
CPC ........... *G06Q 10/087* (2013.01); *G06Q 10/06* (2013.01); *G06Q 10/0833* (2013.01); *G06Q 20/203* (2013.01); *G06Q 20/223* (2013.01); *G06Q 30/018* (2013.01); *G06Q 30/0282* (2013.01); *G06Q 30/06* (2013.01); *G06Q 30/0631* (2013.01); *H04L 9/3239* (2013.01); *H04L 9/3263* (2013.01); *H04L 63/12* (2013.01); *G06F 21/64* (2013.01); *G06Q 10/0875* (2013.01); *G06Q 2220/00* (2013.01); *H04L 2209/38* (2013.01)

(58) Field of Classification Search
USPC ........................................................ 705/28
See application file for complete search history.

(56) References Cited

U.S. PATENT DOCUMENTS 7,472,077 B2   12/2008  Roseman et al.
7,685,074 B2    3/2010  Linden et al.
(Continued)

OTHER PUBLICATIONS

Nakamoto, Satoshi. "Bitcoin: A Peer-to-Peer Electronic Cash System." www.bitcoin.org. 9 pages. (2009).
(Continued)

*Primary Examiner* — Garcia Ade
(74) *Attorney, Agent, or Firm* — Knobbe, Martens, Olson & Bear, LLP

(57) ABSTRACT

Features are disclosed for an interface for verifiable tracking of an item through a supply chain using a distributed electronic ledger. For example, when an item is added to a catalog system, the item information may be included in the creation element at the start of the ledger for the item. A certification authority may be included to verify that items received correspond to the item included in the catalog based on one or more certification rules. If a certification rule is satisfied, a record may be added to indicate transfer of the item from a provider to the catalog system. The certification information may be dynamically presented with item description information such as in response to searches of the catalog system.

16 Claims, 9 Drawing Sheets

(51) Int. Cl.
*G06Q 20/22* (2012.01)
*G06Q 10/06* (2012.01)
*G06Q 20/20* (2012.01)
*G06F 21/64* (2013.01)

(56) References Cited

U.S. PATENT DOCUMENTS

| | | |
|---|---|---|
| 8,122,020 B1 | 2/2012 | Donsbach et al. |
| 2017/0046806 A1* | 2/2017 | Haldenby ............ G06Q 20/102 |
| 2017/0083860 A1 | 3/2017 | Sriram et al. |
| 2017/0111175 A1 | 4/2017 | Oberhauser et al. |
| 2017/0116693 A1 | 4/2017 | Rae et al. |
| 2019/0114334 A1* | 4/2019 | Gunther ................ H04L 9/0643 |

OTHER PUBLICATIONS

WikiPedia, "Hyperledger" (https://en.wikipedia.org/w/index.php?title=Hyperledger&oldid=778216928) (May 1, 2017) 3 pages.
WikiPedia, "Blockchain" (https://en.wikipedia.org/w/index.php?title=Blockchain&oldid=809487081) (Nov. 9, 2017) 9 pages.
International Search Report for International Application No. PCT/US2018/042269 dated Sep. 19, 2018.

\* cited by examiner

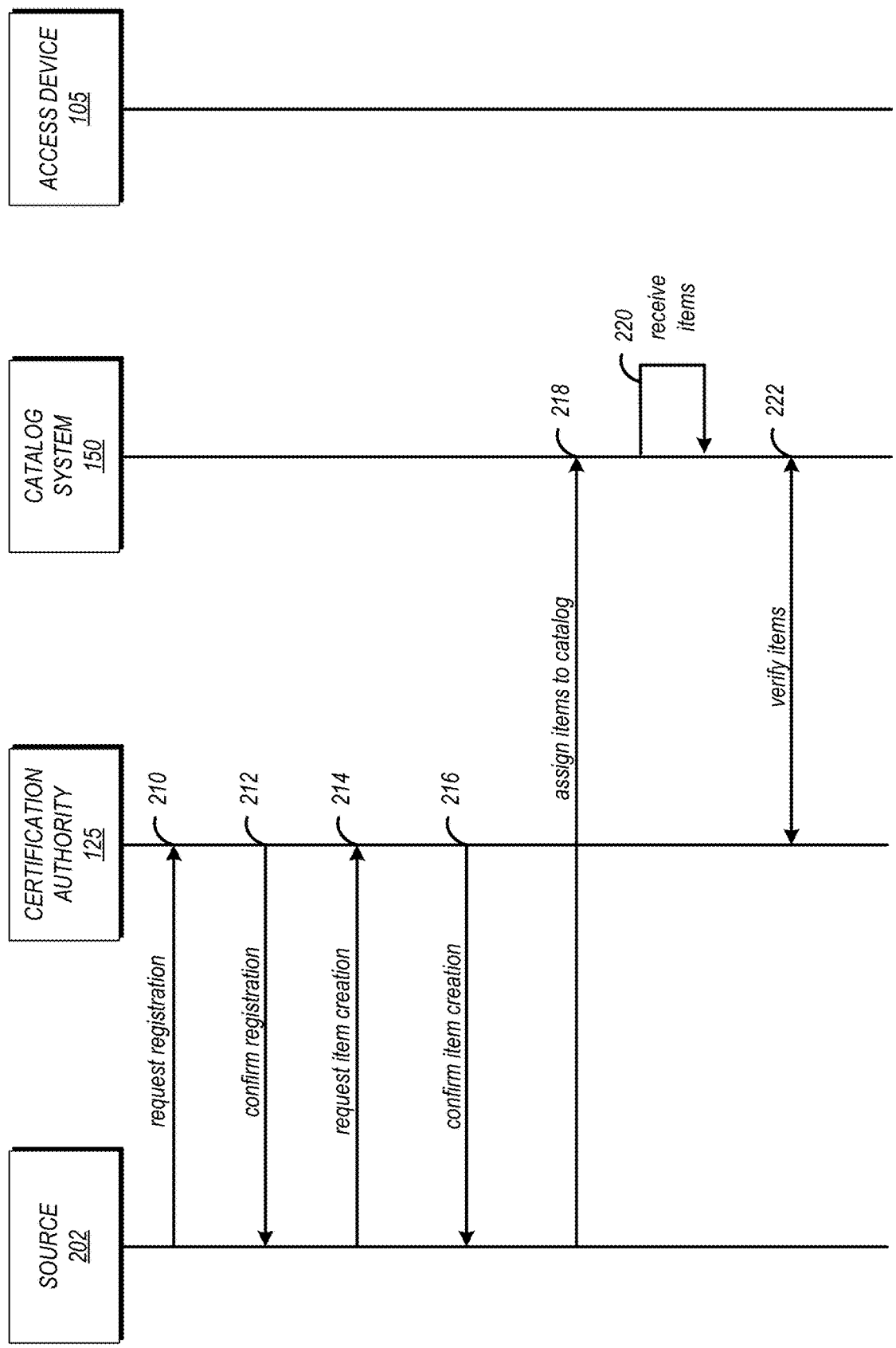

DISTRIBUTED LEDGER CERTIFICATION

BACKGROUND

Trust is earned. Once trust is lost, it can often be difficult to regain. As society moves more activities across borders and into the virtual world, the ability to discern the trustworthiness of an item or party can become a difficult if not impossible task. Technologies for recording information continue to proliferate, but this proliferation presents a patchwork of systems and databases that can often lack transparency, coherency, referential integrity, or security, which can be factors impacting trust.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

FIGS. 2A and 2B are schematic diagrams of messages that may be sent between elements of a system including a certification authority.

DETAILED DESCRIPTION

Figure 1:
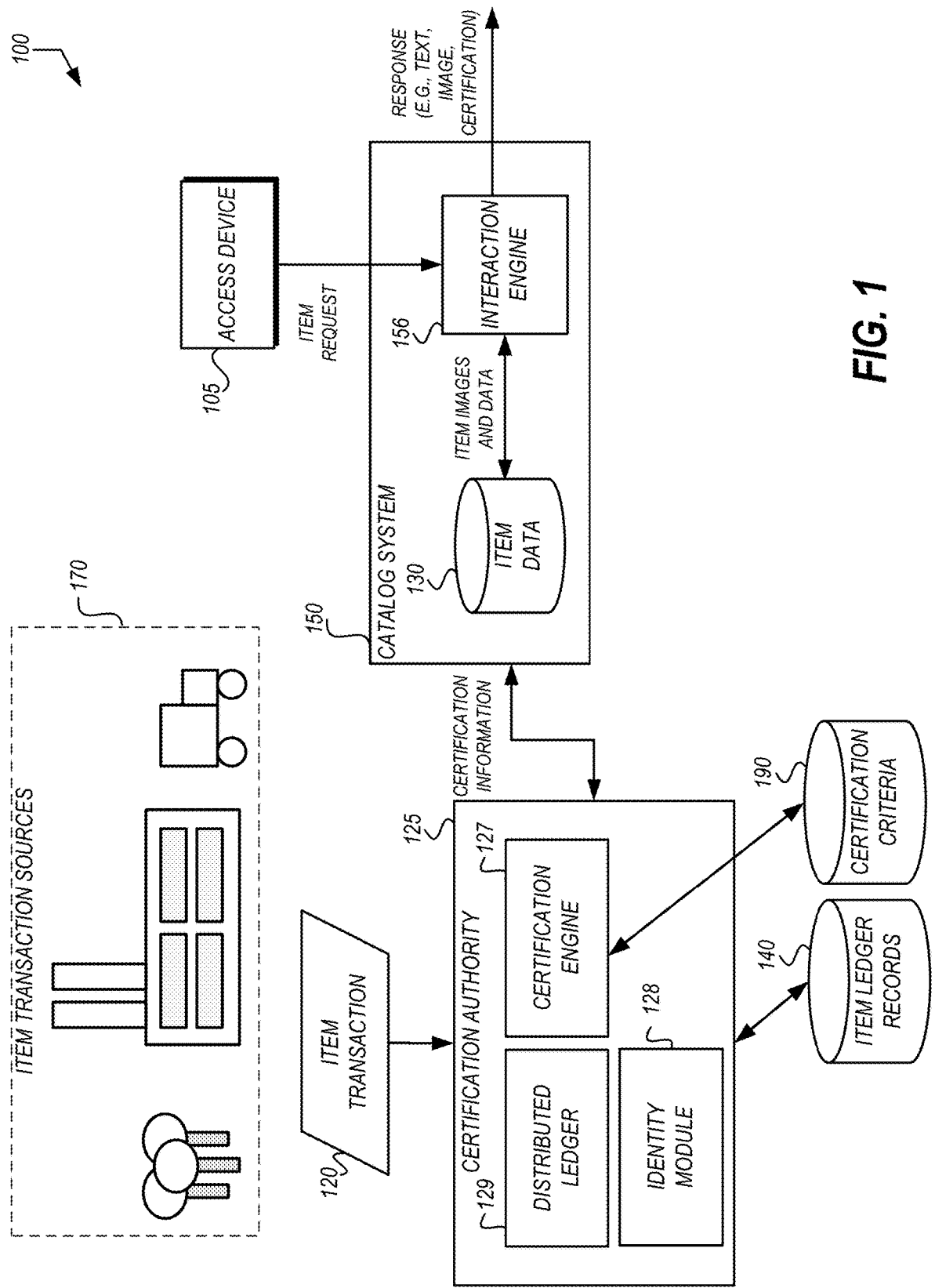
FIG. 1 is a block diagram showing an example environment including a catalog system and a certification authority.

Described are features for improving trust through an enterprise services platform that allows parties to map their global supply chains. Using this mapping can enable and expose real-time visibility into supply chains from the point of production to an end user. The platform may include features for participants in a supply chain (e.g., manufacturer, courier, distributor, end user, secondary user, etc.) to register with a certification authority and integrate existing or new item processing systems with a set of application programming interfaces (APIs) that can consume and store different supply chain events (including test reports and certificates) as items move through the supply chain. The certification authority may also include certification rules for testing and certification. For example, to ensure the quality of an item through the supply chain, a manufacturer may include specific certification rules that must be satisfied before the item may advance to the next step in the chain. The certification authority may validate events sourced from the nodes in the supply chain and can provide a secured, distributed ledger across the network. The digital records in the ledger may be stored by the certification authority (and any other node participating in the distributed ledgering). Access to the distributed ledger may be governed by permission controls that respect the confidentiality of the proprietary supply chain data.

Previous track and trace solutions mapped a limited portion of a supply chain, usually that part of the chain within the purview of the developer of the solution. Yet, the increasingly distributed and modularized physical supply chain where each entity works with multiple customer-facing channels, has led to limited adoption of these siloed tools. The features described break this mold by building a lower-level set of open standards and services that provide a trustworthy framework for participants to use.

The distributed ledgering and certification features described also provide improved confirmation of third-party certifications for parties offering items, such as via a catalog system. Digital signatures from certification authorities like Energy Star and Certified Organic can expose certification tools to participating parties who, in turn, can display these certifications to end users. Certificates of analysis (COAs) or test reports can be collected by parties offering items through the catalog system to ensure a safe and transparent supply chain. Users can request items knowing that an item has moved through the supply chain and maintained authenticity, as verified in some cases by the rules provided by an independent third-party.

As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

FIG. 1 is a block diagram showing an example environment including a catalog system and a certification authority. The environment 100 may include a catalog system 150. The catalog system 150 may be included to provide a central repository of items that can be accessed by a user. The catalog system 150 may provide functionality for users to, e.g., interactively browse, search for, review, rate, tag, purchase, sell and obtain recommendations of catalog items such as appliances, electronics, books, clothing, jewelry, and the like. Examples of such systems are described in greater detail, e.g., in U.S. Pat. Nos. 7,685,074; 7,472,077; and 8,122,020, each of which is incorporated herein by reference in its entirety. As shown, an access device 105 may transmit an item search request to a catalog system 150. The item search request may include text input such as a search query term. In other embodiments, the item search request may include audio data representing an utterance from a user.

The access device 105 may be an electronic communication device configured to transmit machine readable messages to the catalog system 150. Non-limiting examples of the access device 105 include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The messages may be formatted according to a standardized protocol such as TCP/IP, HTTP, FTP, or the like. The transmission may be sent wired, wireless, or hybrid wired-wireless networks.

Searching is one example of an interaction with the catalog system 150. An interaction engine 156 included in the catalog system 150 may receive the item search request. The interaction engine 156 may be configured to determine the request is a search request and perform a search for items included in an item data store 130 using the item search request information. For example, if the item search request includes audio data, the search engine 156 may be configured to obtain a transcription of the audio from an automatic speech recognition system. Using the transcription or, in the case where the search query term is provided in textual form in the item search request, the interaction engine 156 may identify items in the item data store 130. The identification may be a literal identification (e.g., exact match between item data and the item search request). The identification may be a partial match (e.g., words with similar stems or synonyms matching). In some implementations, the search may be executed against an index of the item data store 130.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

Other examples of interactions include: viewing detailed information for a particular item such as images, user submitted reviews, descriptive text or multimedia; downloading the item; subscribing to the item; submitting a review for an item; conducting a transaction to acquire the item; or the like. The interaction engine 156 may identify a type for a request received from the access device 105 to determine a processing path for the request.

As discussed, the information about an item that is stored by the catalog system 150 may include descriptive information. In FIG. 1, a certification authority 125 may be included in the environment 100 to provide certification information about an item. Certification information may identify whether an item satisfies predetermined criteria for a certification. For example, an item may be certified as being free of hazardous materials. This information may not be present in the item data store 130. The information may not be stored in the item data store 130 in an objective fashion that can be easily verified by a user or other third-party. To provide the certification information, the certification authority 125 may include a certification engine 127. The certification engine 127 may be configured to compare information about an item to determine whether the item meets specific criteria for a certification (e.g., free of hazardous material). The criteria may be stored in a certification criteria data store 190. A certification criterion may be provided by a certification group such as a consumer advocacy group, special interest group, or the like.

To certify an item, a verifiable record for the item indicating, for example, what materials were used to make the item, where the item was made, who made the item, when the item was made, and so forth, is needed. The certification authority 125 may be associated with a distributed ledger 129. One example of a distributed ledger is a blockchain ledger. The Hyperledger suite of products offered by The Linux Foundation® includes examples of blockchain ledgering technologies that may be used to implement aspects of the distributed ledger 129 described. The distributed nature of the distributed ledger 129 ensures that each node participating in the ledgering can maintain a full record of the transactions. FIG. 1 shows a single instance of the distributed ledger 129 managed by the certification authority 125. It will be appreciated that other participants may operate independent nodes in support of the distributed ledger 129. For example, the catalog system 150 may be a participant or item transaction sources 170 may be participants. Examples of the item transaction sources 172 shown in FIG. 1 include a farm where materials for the item were produced, a factory where the item was made, and a delivery service used to transport the item. In practice, any participant in the supply chain for the item, from the raw materials to the end user, may be a participant.

An item transaction 120 may be provided to the certificate authority 125 for inclusion in the distributed ledger 129. In some implementations, the item transaction 120 may be recorded first in the distributed ledger 129 and then propagated to other participants in the distributed ledger network. In some implementations, the item transaction 120 may be received as a propagation of an entry from another node. The item transaction 120 may be used to create an item ledger record in the distributed ledger 129. The item ledger record may be associated with a type depending on, for example, a type of transaction being recorded. For example, if the transaction is the manufacturing of the item, the item transaction 120 may indicate which items were combined to create the item identified in the item transaction 120. Item ledger records may be stored in an item ledger records data store 140.

The distributed ledger 129 may include an access module 128 to ensure only authorized entities can access or add records to the distributed ledger 129. The identity module 128 may include permissions for an entity that specify the type of record the entity can add to the distributed ledger 129. For example, a courier may be permitted to add delivery record types but not item manufacturing record types. The identity module 128 may be configured to process a participant login. For example, to add a record, a participant may login to the certification authority 125. If sufficient credentials are presented (e.g., username, password, encryption key, token, two-phase authentication, etc.), the identity module 128 may permit access to the distributed ledger 129. The distributed ledger 129 or the identity module 128 may then determine which actions, if any, the authorized user may take (e.g., add records, read records, add records of specific type or for specific item, read records of specific type or for specific item, etc.). This security provides an auditable trail through the supply chain as the item moved between parties. If the status of the item is called into question by a receiving party, a history of the item may be generated from the distributed ledger 129 records for the item.

Using the secure and verifiable record for an item, the certification engine 127 may determine whether an item's history indicates compliance with the certification criterion. The certification criterion may be specified as a certification rule. The rule may include one or more criterion. The certification rule may include certification information to present if an item is deemed certified. The certification information may include a graphic image (e.g., seal of approval), text, or interactive information (e.g., hyperlink to the party that specified the criterion). In some implementations, the certification engine 127 may not be able to determine the compliance using the information included in the distributed ledger 129. In some implementations, the certification engine 127 may identify information missing from the distributed ledger 129 while comparing the item's history with the certification rule. In such instance, the certification engine 127 may be configured to transmit a request to obtain the missing information. In some implementations, this may include transmitting a request for physical collection of information for the item (e.g., scanning an item stored in a warehouse location, adding a verification task to human tasking system).

Figure 2B:
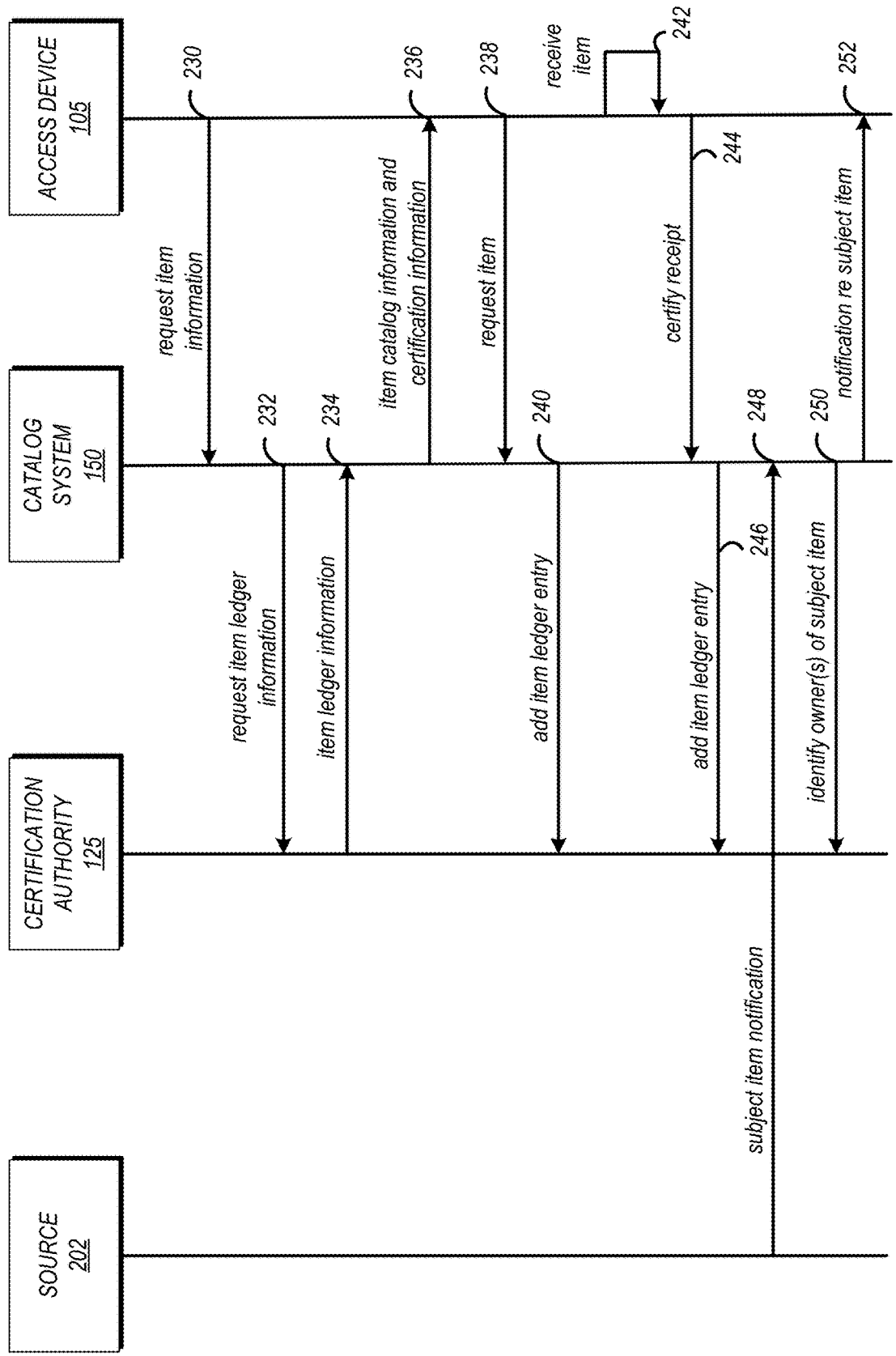

FIGS. 2A and 2B are schematic diagrams of messages that may be sent between elements of a system including a certification authority. The diagrams of FIGS. 2A and 2B show messages between a source 202 (e.g., item source), the certification authority 125, the catalog system 150, and the access device 105. It will be appreciated that other intermediary elements may be included. For the sake of clarity, these intermediaries have been omitted from FIGS. 2A and 2B as well as the descriptions thereof.

Via message 210, the source 202 may transmit a registration request. The registration request may include information to register the source 202 as a participant in the distributed ledger. The message 210 may include credentials to authenticate the source 202 such as a password, a user name, encryption key, token, or other machine readable information to identify and authenticate the source 202. Once the source 202 is authenticated based on the provided credentials, the certification authority 125 may also determine whether and in what capacity the source 202 is authorized to participate in the distributed ledger. For example, some sources may be permitted to read ledger records, but not permitted to add to or alter the ledger. As another example, a source may be limited to the types of records they can add to the ledger (e.g., a courier can only add records having a type that corresponds to delivery). In some implementations, the identity of the device used by the source 202 may be used as part of the registration. For example, the registration may be limited to a specific device that satisfies a threshold level of security (e.g., connectivity type, operating system, hardware architecture, etc.) or location (e.g., network IP address, network IP address range, physical location of the device, etc.).

The certification authority 125 may provide a response message 212 confirming the registration and, in some implementations, any participation limitations on the source 202. In some implementations, the response message 212 may include additional credentials that can be used by the source 202 for adding entries to the distributed ledger. The additional credentials may be valid for a predetermined period of time. This provides an additional level of security to the ledgering system by controlling the terms of a participant's access to the ledger. Should the source 202 become compromised or identified as acting contrary to a desired level of trust, the credentials for the source 202 can be revoked. A user presenting a revoked credential may be denied access to the system.

Assuming the source 202 is properly registered, an item creation message 214 may be transmitted from the source 202 to the certification authority. The item creation message 214 may be transmitted during a communication session between the source 202 and the certification authority 125. The session may be established when the source 202 presents credentials that are validated by the certification authority 125.

The item creation message 214 may include information identifying an item such as an item identifier. The request may be received indirectly from the source 202, such as a propagated item ledger record from another node included in the distributed ledger network. In some implementations, the request may be generated via an interface such as an item registration user interface.

Figure 3:
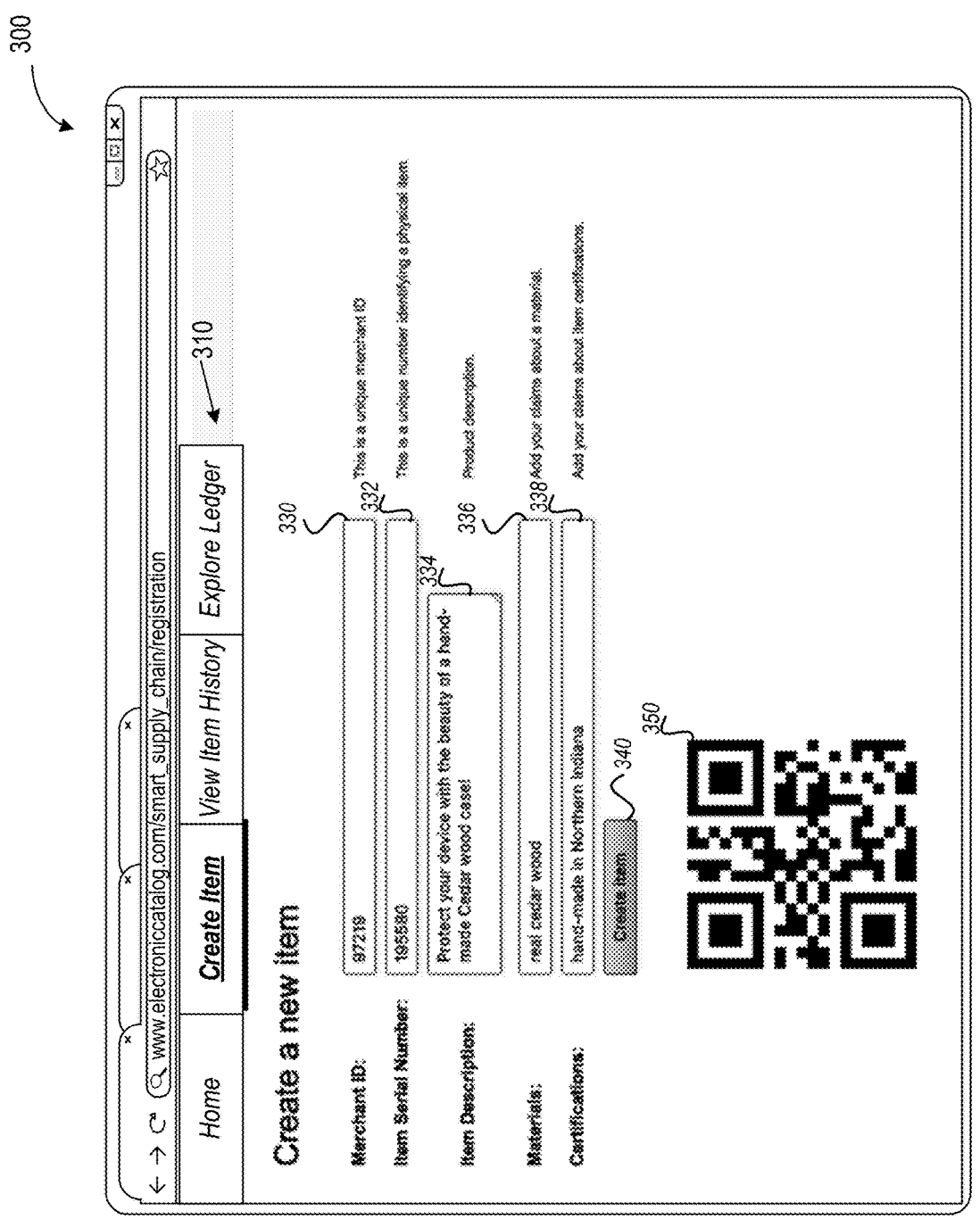
FIG. 3 is a pictorial diagram illustrating an example user interface for registering an item with a certification authority.

FIG. 3 is a pictorial diagram illustrating an example user interface for registering an item with a certification authority. As shown in FIG. 3, the user interface 300 may include one or more control elements (e.g., buttons; clickable images; hyperlinks; input fields). A control element can be activated (e.g., clicked, selected, tapped, verbally identified, etc.) to cause a message to be transmitted to the certification authority 125. The interface 300 may be used to register an item using a web-browser or other application window via an access device.

The user interface 300 includes a menu 310 of buttons. The user interface 300 shown in FIG. 3 illustrates the item creation features displayed upon activation of the "Create Item" button included in the menu 310. To create an item, the user interface 300 may include a merchant identification control element 330. The merchant identification control element 330 is shown as a text input field. In some implementations, a value may be automatically populated based on the merchant identifier associated with the user accessing the user interface 300. For example, a user may provide a username or a password to access the user interface 300. The access information may be associated with the merchant identifier. In some implementations, a user may be associated with more than one merchant. In such instances, the merchant identification control element 330 may be rendered as a selector element including selections for each merchant the user is associated with.

The user interface 300 may include an item identification control element 332. The item identification control element 332 is shown as a text input field. The item identification control element 332 may receive an input value indicating the identifier for the item to be added to the distributed ledger.

The user interface 300 may include an item description control element 334. The item description control element 334 is shown as a text input field. The item description control element 334 may receive an input value indicating a description for the item to be added to the distributed ledger.

The user interface 300 may include a material claim control element 336. The material claim control element 336 is shown as a text input field. The material claim control element 336 may receive an input value indicating a claim about a material included in the item to be added to the distributed ledger. In some implementations, the control element 336 may be implemented as a selector element where each selection indicates a claim for the item. A material claim may identify a material included in the item such as type of cotton, leather, or the like.

Similar to the material claim(s), the user interface 300 may include a certification claim control element 338. The certification claim control element 338 is shown as a text input field. The certification claim control element 338 may receive an input value indicating a claim about a certification the item is believed to comply with. In some implementations, the control element 338 may be implemented as a selector element where each selection indicates a certification rule for certifying the item. The selections may be obtained from the certification criteria data store 190.

A create item button 340 may be included to submit the provided input values to the certification authority 125. In response, the certification authority 125 may provide a confirmation that the item was added to the distributed ledger. The confirmation may include a scannable code 350 which can be used to uniquely identify the item. The scannable code 350 may be generated based on a combination of the merchant identifier and the item identifier. The scannable code 350 may be generated based on a transaction identifier for ledger record created for the item. In some implementations, the scannable code 350 may decoded to obtain the information needed to retrieve item ledger records for the item.

In some implementations, the scannable code 350 may be a machine-readable code, e.g., optical code, one dimensional (1D) bar code, two dimensional (2D) bar code, recognizable text characters, or an image. In the case of a 2D bar code (also referred to as a "matrix code"), the scannable code 350 may be a QR® or "quick response" code, an EZCode® bar code, a PDF417 or "portable data file" bar code, a high capacity color bar code, etc. The scannable code 350 may be affixed or otherwise associated with the item such that it can be tracked from the supplier, transportation, fulfillment center, and ultimate end user.

The example interface shown in FIG. 3 that may be used to create an item is illustrated as a user interface. In some implementations, the information may be received using an unattended interface such as through a service interface. In such implementations, items may be programmatically added to the distributed ledger. The example interface shown in FIG. 3 may include alternate or additional elements. For example, creating an item may include identifying other items that may be combined to create the new item. In such instances, the interface 300 may include one or more elements to specify items in the distributed ledger that may be materials forming the new item. The records for the materials may be merged or otherwise associated with the creation record for the new item. In this way, the history of the input materials may be retained in association with the new item.

Returning to FIG. 2A, the certification authority 125 may process the item creation message 214. The processing may include determining whether the item identifier is a new identifier or whether an item associated with this identifier is already present in the distributed ledger. In some implementations, a record may be uniquely identified using a combination of the item identifier and the source identifier. The certification authority 125 may provide a message 216 confirming the registration. The confirmation may include an acknowledgment code. The confirmation may include a scannable image that can be printed on the item or packaging thereof. The confirmation may include a transaction identifier that can be used to uniquely identify the creation transaction in the distributed ledger.

Via messaging 218, one or more items registered, such as via message 214, may be transferred to the catalog system 150. The messaging 218 may include adding one or more records to the distributed ledger indicating a transfer of the item(s) from the source 202 to the catalog system 150. Note that this record may be received by the catalog system 150 to physical delivery of the item(s).

Via messaging 220, the item(s) may be received by the catalog system 150. Receiving the item(s) may include scanning a physical item at a processing facility. Scanning the item may include capturing an image of a portion of an item or packaging thereof. This portion may include a machine readable code that can be decoded to obtain information to identify the item ledger record for the item. Via messaging 222, the catalog system 150 may verify the items(s) based at least in part on the information identifying the item ledger record. For example, the verification may include determining whether a record of the transfer of the item to the catalog system 150 is included in the distributed ledger. The verification may include determining that the transfer record is not revoked. For example, in some implementations, the source 202 may decide to revoke a transfer of an item due to, for example, identified manufacturing defects or error in item processing. This allows the catalog system 150, at the point of receiving an item, to decide whether to accept the item or to refuse delivery of the item.

Turning to FIG. 2B, if the catalog system 150 verifies receipt, the item may be listed via the catalog system 150. Listing an item can allow the item to be discoverable through the catalog system 150 by users such as via a search request or a request for item information 230. Searching or requesting item information may be referred to as a browsing session. During a browsing session, the catalog system 150 may retrieve information about the item stored in an item data store such as the item data store 130 shown in FIG. 1.

Via message 232, the catalog system 150 may also request item ledger information from the certification authority 125. The message 232 may include an identifier for the item to identify those records in the distributed electronic ledger related to the item. The message 232 may include information received from the item data store about the item. For example, the manufacturer, the category for the item (e.g., shoe, book, food), or a characteristic of the item (e.g., BPA-free, 100% cotton, organic, free trade, etc.) may be included in the message 232 transmitted to the certification authority 125.

The certification authority 125 may provide a response message 234 including item ledger information about the item identified in the message 232. The item ledger information may include the item ledger records for the item included in the distributed ledger. The item ledger information may include certification information for the item. For example, using the information about the item from the message 232, a certification rule may be identified to assess a characteristic of an item. The certification authority 125 may compare one or more item ledger records for the item to the certification rule. If the item ledger records correspond to the certification rule, certification information identified by the certification rule may be provided in the message 234.

Message 236 may be transmitted from the catalog system 150 to the access device 105. The message 236 may cause the display of the item information from the item data store along with the certification information from the certificate authority 125. The item and certification information may be presented on a user interface.

Figure 4A:
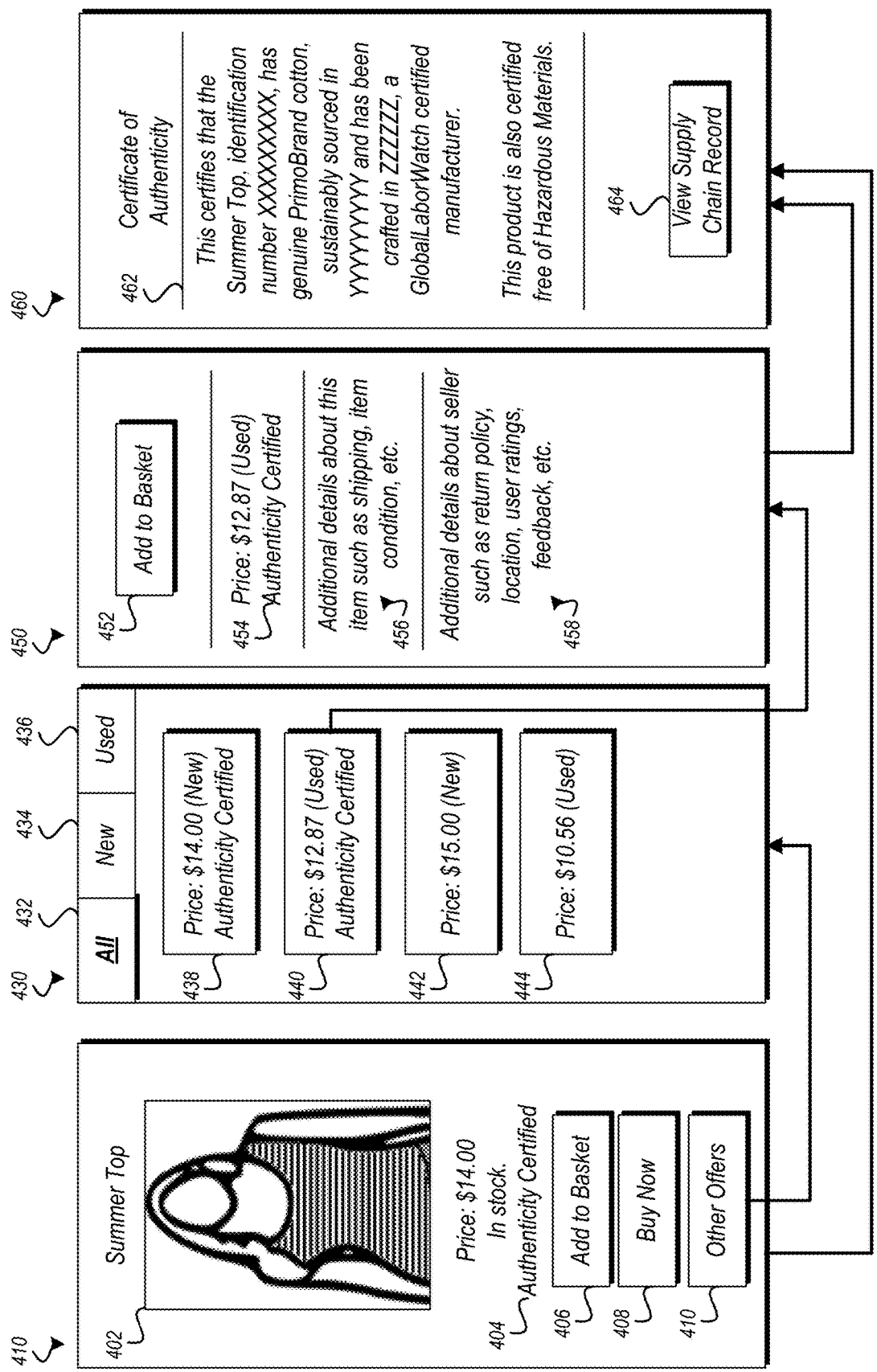
FIG. 4A is a pictorial diagram illustrating example user interface transitions during a user browsing session.
Figure 4B:
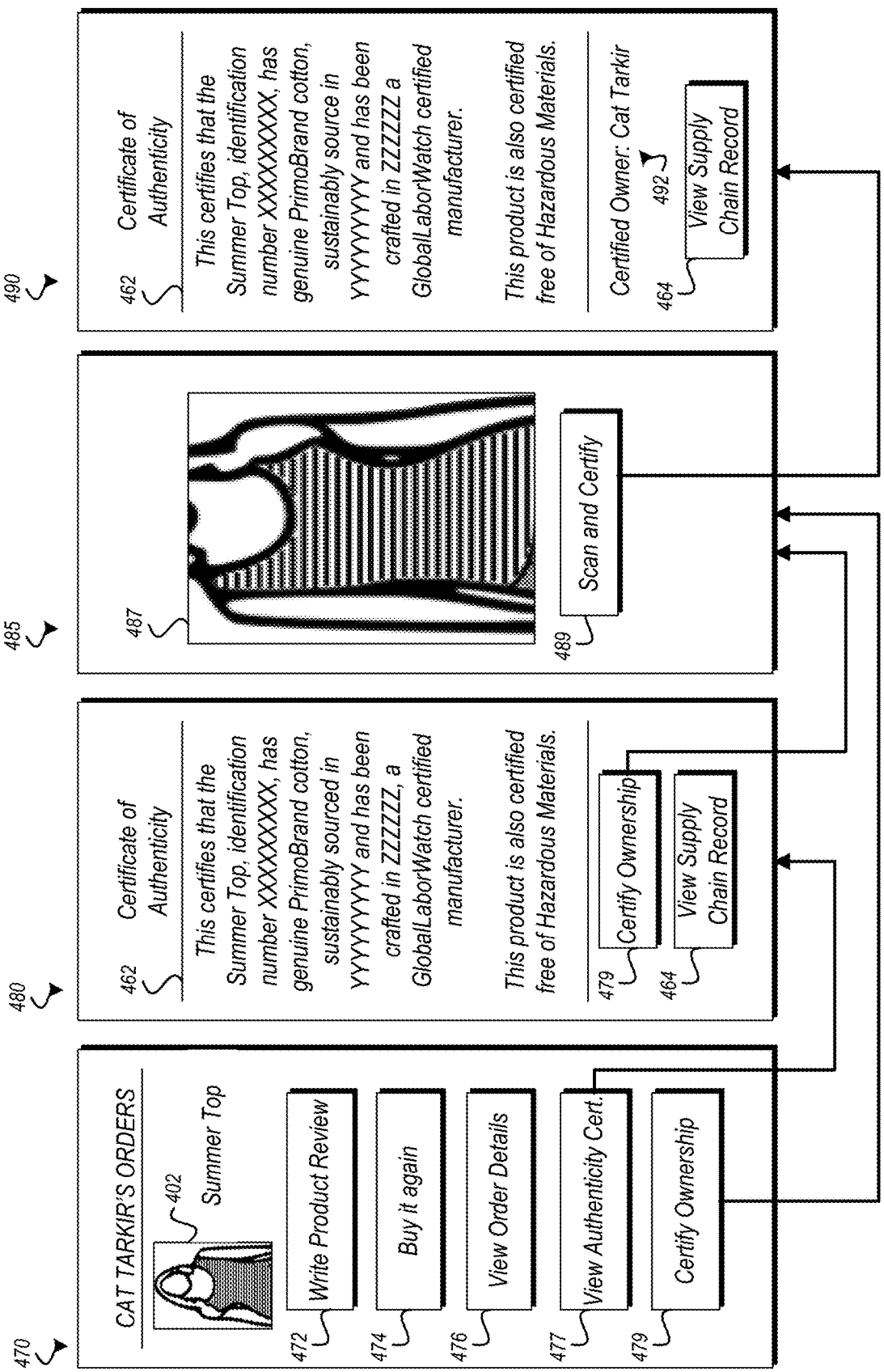
FIG. 4B is a pictorial diagram illustrating example user interface transitions during a user certification session.

FIG. 4A is a pictorial diagram illustrating example user interface transitions during a user browsing session. The user interfaces shown in FIGS. 4A and 4B may. The interfaces shown in FIGS. 4A and 4B are illustrated as mobile device interfaces, but may be presented through a webbrowser or application executing on another type of access device. The transitions in FIG. 4A show how certification information about an item can be as part of a transaction to obtain the item. An item display interface 410 may be presented at the access device in response to a search request. The access device may receive information about an item including an image 402, price, inventory level indicator, or other information about the item obtained from the catalog system. The access device may also receive information about the certification of an item. As shown in FIG. 4A, certification information 404 is displayed as text. In some implementations, the certification information 404 may include image, audio, video, or other presentable indicators of the certifications applicable to the item shown. The certification information 404 may be received from the certification authority after assessing the distributed ledger using a certification rule.

The certification information 404 may be associated with an interaction that, when detected by the access device, causes the presentation of details about the certification. The details may be displayed via a certification interface 460. The certification interface 460 may display specific information 462 about the certification(s) applicable to the item. For example, if the distributed ledger for the item includes an item ledger record indicating the use of "PrimoBrand" cotton from a specific location, a certification rule may identify the item ledger record and include certification information indicating this fact about the item. Such information can be important factors in helping users differentiate between items and providers. The information may be used by the catalog system for dynamic presentation of items. For example, it may be desirable to rank the presentation order of items based on the certifications such that items which have a higher degree of verifiable authenticity are ranked above those items which may have questionable pedigree. The information may be used by the catalog system to control what items are offered through the catalog system. For example, certain jurisdictions may not permit items including a specific material. Using the information about the item included in the distributed ledger, such items can be excluded even if the item matches the criteria provided in a user search request. This prevents presentation of items to a user that cannot actually be provided. Similarly, the catalog system may limit the transactions available for an item based on the distributed ledger information. For example, an item including a lithium battery or aerosol items may require specific shipping protocols. When initiating a transaction for such an item, it may be desirable to remove shipping options based on the material information for the item as specified in the distributed ledger. The catalog system may specify certification rules to provide the indications for the features described. In some implementations, the catalog system may obtain the item ledger records for the item and perform a dynamic assessment.

Because the distributed ledger includes an open record of an item's history, it may be desirable to include a view supply chain record control element 464 on the certification interface 460. The view supply chain record control element 464 is shown in FIG. 4A as a button. When activated, the view supply chain record control element 464 may cause the display of the chain of item ledger records for the item or a portion thereof. A user can see the specific records that led to the certification(s). For some items this history can be part of the value of the item. For example, collectable items such as sports memorabilia derive value from being an actual artifact used in a particular game by a particular player. The features described provide a secure and verifiable system to track and present the history of an item from the game to a collector who may acquire the item from an intermediary many years later.

Returning to the item display interface 410, the interface 410 may include control elements to interact with the item such as an add to basked control element 406, which may reserve an item for the user, or a buy now control element 408, which initiates a transaction to transfer the item to the user. In some instances, other providers may list the item in the catalog system. An other offers control element 410 may be included in the item display interface 410. When activated, the other offers control element 410 may cause the display of an offers interface 430.

The offers interface 430 may present the listings for the item from multiple providers that are accessible through the catalog system. The offers interface 430 may include filtering control elements such as a show all button 432 that, when activated, causes display of all items, a show new button 434 that, when activated, causes display of items listed with a condition of new, and a show used button 436 that, when activated, causes display of items listed with a condition of used. Other filtering control elements such as price, location, shipping options, and the like may be included in the offers interface 430 to limit the number of alternative listing presented through the catalog system.

The offers interface 430 may receive item information for a listing from the catalog system such as a price, condition, or other information maintained in the item data storage. As the catalog system prepares the item information for display, the catalog system may obtain certification information for each item to be displayed from the certification authority. In some implementations, it may be desirable to identify the item information needed to obtain certification information and allow the display device to dynamically retrieve the certification information at the time of display. In this way, if an item ledger record is added for the item, the certification status shown via the display corresponds with the status as of the time of display.

Each item offer may be displayed as a control element (e.g., control elements 438, 440, 442, and 444). When the control element, such as the control element 438, is activated, an item detail interface 450 may be displayed. The item detail interface 450 may include control elements to interact with the item such as an add to basket control element 452. The item detail interface 450 may also include other item information from the catalog system such as additional details about the item 456 or additional details about the offer 458 (e.g., the seller, return policy, location of the item, ratings, etc.). The additional details may be maintained by the catalog system and stored in the item data store. The item detail interface 450 may also include certification information 454 as described. In some instances, an item may not be certified. In such instances, it may be desirable to include an indication that the item has not or could not be certified. In some instances, it may be desirable to simply omit an indication of certification status. In such instances, those items which are certified may "stand out" from those lacking this additional endorsement. Similar to the certification information 404, the certification information 454 may be associated with an interaction that, when detected by the access device, causes the presentation of details about the certification. The details may be displayed via the certification interface 460.

Returning to FIG. 2B, the access device 105 may transmit a request 238 for the item. The request 238 may include the identifier of the item. The catalog system 150 may determine whether any preconditions are met for the transfer such as inventory level, sufficient funds, required delivery information, import/export restrictions, etc. If the catalog system 150 confirms the preconditions are satisfied to complete the transfer, message 240 may be transmitted from the catalog system 150 to the certification authority 125 to create a record of the transfer in the distributed ledger.

In some implementations, the certification authority 125 may determine whether the transfer meets certain criteria such as shipping of certain products using an identified shipping method. The certification authority 125 may refuse to enter a record to the ledger if it violates a certification rule. In some implementations, the certification rule may identify what action to take if the conditions specified in the rule are not met. For example, an item may be held until a violation can be resolved. Such determinations may be communicated to the catalog system 150 in response to the message 240.

The access device 105 or user thereof may receive the item. The user may indicate via message 242 receipt of the item. In some implementations, the receipt may be identified by a third party system such as a courier system. Receiving the item may include activating one or more features of the access device 105 to receive information about the item. For example, the access device 105 may include a camera and receiving the item may include capturing an image of the item or packaging thereof. The access device 105 may transmit a message 244 to certify receipt of the item. The message 244 may include the identifier for the item or a transaction identifier therefor.

The catalog system 150 may add an item ledger entry indicating the physical transfer of the item to a user of the access device 105 by transmitting a message 246 to the certification authority 125. In some implementations, the access device 105 may communicate the certification message 244 to the certification authority 125 without contacting the catalog system 150. Whether via the catalog system 150 or bypassing the catalog system, the certification message may include information obtained by the access device 105 as part of receiving the item.

The access device 105 may present one or more user interfaces to collect, transmit, and confirm the certification process. Examples of such interfaces are shown in FIG. 4B.

FIG. 4B is a pictorial diagram illustrating example user interface transitions during a user certification session. A certification session may be initiated via an access device by a user that requested transfer of an item. A transaction summary interface 470 may be displayed to show past transactions for the user. In the example shown, the orders for user "Cat Tarkir" are displayed. The transactions may include an order for an item, such as the summer top described with reference to FIG. 4A. The transaction summary interface 470 may include the image 402 showing the item maintained by the catalog system. The transaction summary interface 470 may include control elements to interact with the item. For example, a review product button 472 may be displayed and, when activated, receives user review input (e.g., text, audio, images, etc.) for the item. As another example, a repeat transaction button 474 may be displayed, and, when activated, causes the transaction to be repeated for the item. This may be desirable for items such as personal care products. As a further example, a view transaction details button 476 may be displayed and, when activated, cause display of additional details about the transaction such as delivery status, payment or refund status, recipient address, etc.

The interface 470 may include a view authenticity control element 477. The view authenticity certification control element 477 may cause display of a view certification interface 480. The view certification interface 480 may include similar information as shown in the certification information 454 of FIG. 4A. The view certification interface 480 may also include a certify ownership control element 479. The certify ownership control element 479 may also be included in the transaction summary interface 470.

The certify ownership control element 479 may cause the display of an add certification interface 485. The add certification interface 485 may cause the activation of a scanning device included or coupled with the access device. As shown in FIG. 4B, the add certification interface 485 may receive an image 487 from a camera. The add certification interface 485 may include a confirmation control element 489. When the confirmation control element is activated, the scanned information along with information to identify the item may be transmitted to the catalog server or the certification authority. An identifier for the user or the transaction may also be provided. This creates a link between the item and a specific transaction. The certification authority may determine whether the item identified in the scanned information corresponds to the item identified as part of the transaction. The correspondence may be determined based on an identifier such as a scannable code like that shown in FIG. 3. The correspondence may determine whether the user is authenticated. For example, the interfaces may be provided via an application. To access the application, the user may provide credentials to authenticate the user's identity. The correspondence may determine whether a record exists in the ledger for the item. For example, a proposal for assignment record may be entered in the distributed ledger. The proposal for assignment record may include an identifier of the party initiating the transfer and an identifier for the user to receive the item. If a user other than the identified user attempts to claim the item, the system may reject the certification request.

If the item ledger record is added, a user specific certification interface 490 may be displayed. As compared with the certification information 454 of FIG. 4A, the user specific certification interface 490 also includes user certification information 492. The user certification information 492 may indicate a current owner of an item. This certification information 492 may be displayed to specified users of the system such as the user who is identified in the certification information 492, friends, the seller of the item, or another limited set of parties. This certification information 492 may be used to track the item such as in the event of a recall.

Returning to FIG. 2B, the source 202 may determine that a particular item is defective or include a defective part. The source 202 may not have the contact information for the recipient of the item, but the catalog system 150 may have access to the contact information. In prior systems, such a notification typically required a broad message to be sent to users based on, for example, the date the item was received. In practice, only a small percentage of items may be subject the notification, but since the specific recipients of the affected products cannot be accurately determined, the broadcast message may be used. The features described provide targeted notifications to only those items subject to the notification. This can ensure more efficient messaging by reducing the resources needed to transmit the messages to those recipients actually associated with the identified items rather than users who may be associated with an affected item.

The source 202 may provide a message 248 including notification information to the catalog system 150. The notification information may identify the item(s) affected. The notification information may include a notification message to transmit to the holders of an affected item.

Via messaging 250, the catalog system 150 may identify the owner(s) of the items identified in the message 248 by querying the distributed ledger for item records corresponding to those identified by the message 248. The items may be identified by item identifier. The items may be identified by a specific value included in item ledger records (e.g., specific record type including a specific source).

Once the affected items are identified, the catalog system 150 may identify the current owner of the item. The owner may be identified using a user identifier or transaction identifier included in the user certification record for the item. The contact information for the user may exist in a storage device of the catalog system 150 such as in an item data store. Using the contact information available to the catalog system 150, the catalog system 150 may transmit a notification message 252 to the access device 105 of a user who received the affected item. This process can also be valuable in contacting secondary owners because transfers from an original owner to another owner can be recorded in the distributed ledger for the item. Accordingly, the most recent recipient of the item may be accurately identified.

Figure 5:
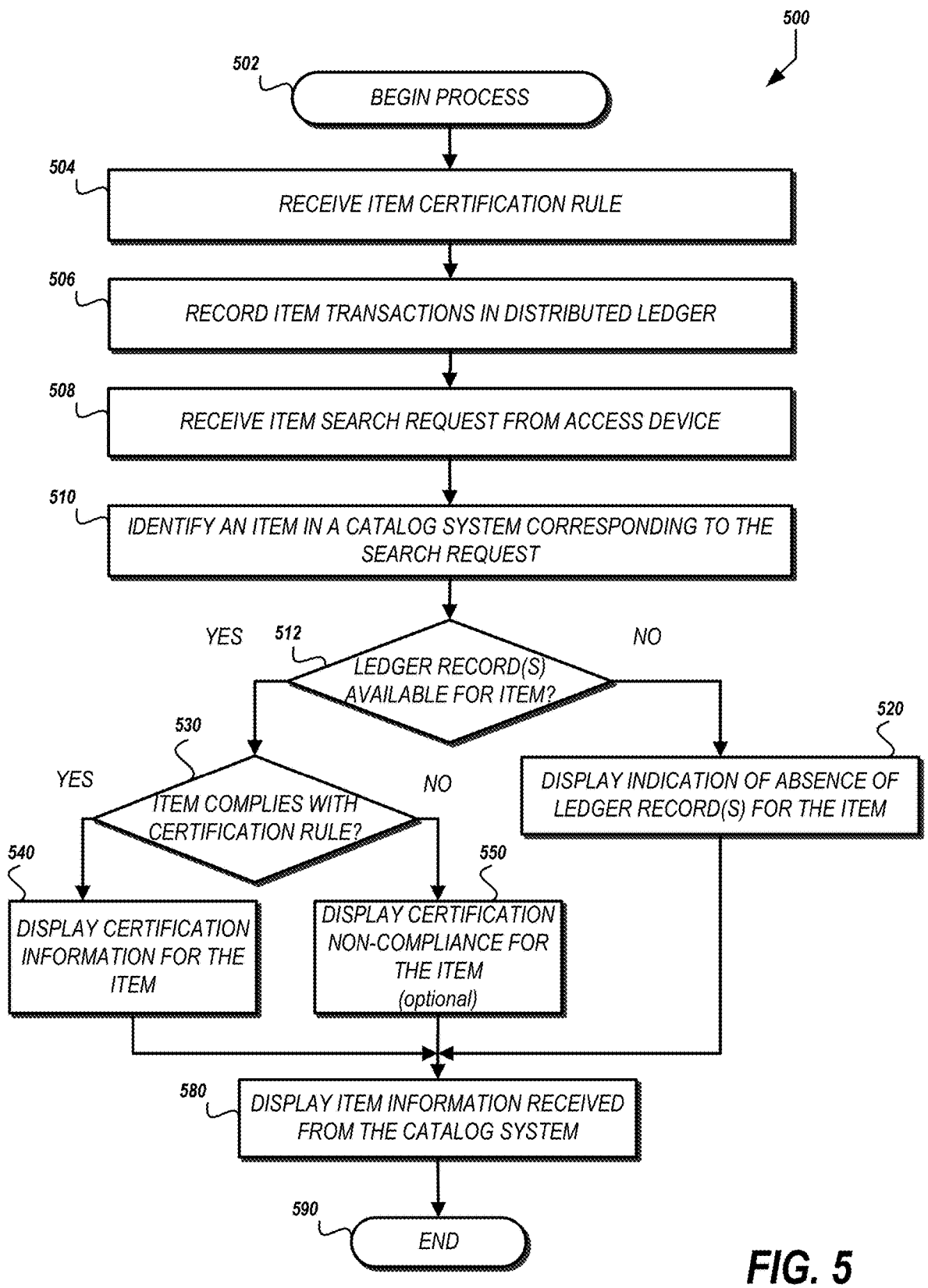
FIG. 5 is a flow diagram depicting an example method of item certification.

FIG. 5 is a flow diagram depicting an example method of item certification. The method 500 may be implemented in whole or in part by the devices described such as the certification authority 125 or the catalog system 150. The method 500 illustrates how certification information may be generated for an item based at least in part on distributed ledger information for the item.

The method 500 may begin at block 502 with the assumption that the item can be discovered through a catalog system. At block 504, the certification authority 125 may receive an item certification rule. The item certification rule may identify an item ledger record type to certify the item or property thereof. For example, if an item is claiming to be imported, the item certification rule may identify a customs record type present in an item ledger record for the item. The certification rule may include certification display information to display upon certification of the item. For example, a certification statement may be presented such as those shown in the interfaces of FIG. 4A or 4B. The certification statement may include a template. The template may include one or more content slots for inserting specific details associated with the item into the certification statement. For example, a standard statement may be tailored to include the specific item identifier. In some implementations, the template may include a slot to be filled with information received from an item ledger record. For example, a slot may be included to identify the name of the factory where an item was produced. This name may be obtained from an item ledger record for the item. The item certification rule may include a specific value required to be present within an item ledger record for the item to satisfy the certification rule. For example, if an item claims to be made with cedar, the certification rule may look for an item ledger record including the word "cedar."

At block 506, the certification authority may record item transactions in a distributed ledger. The item transactions may be received from directly or indirectly from a participant in the ledgering system. The item transaction may indicate that a produced item is formed from an input item. In such instances, the ledger records from the input item may be merged or otherwise associated with the produced item. The item ledger records may be organized to facilitate identification of records for certain items. For example, it may be desirable to quickly identify items with a hazardous or critical component, such as a battery. In such instances, it may be desirable to apply an indexing rule that identifies a distributed record type or distributed record value which should be indexed together. In the battery example, the records related to a battery may be identified using the indexing rule and the storage locations for the records maintained as part of a search index. The index may identify one or more storage locations for the distributed electronic ledger including the distributed electronic ledger record type or the distributed electronic ledger record value identified by the indexing rule. The index may be shared across nodes participating in the distributed ledgering.

At block 508, the catalog system may receive an item search request from an access device. The item search request may include one or more criteria specifying the items of interest. A criterion may include item name, item type, item seller, item manufacturer, keywords, or the like. The catalog system may identify one or more items within the item data store that correspond to the one or more criteria at block 510. For example, if a criterion specified the phrase "summer top," items with a description including the phrase "summer top" may be identified.

At block 512, the catalog system may determine whether one or more item ledger records are available for the item. The determining may include transmitting a request to the certification authority or other node with access to the distributed ledger. The request may include an identifier for an item. The identifier may include one or more of an item identifier or a merchant identifier. These values may correspond to the registration information provided when the item was added to the distributed ledger such as via the interface shown in FIG. 3.

If no records are available, at block 520, the catalog system may cause display of an indication that no ledger records are available for the item such as via an access device. In some implementations, the indication may include omitting display of certification information. At block 580, the catalog system may cause display of item information for the item retrieved from the item data store. The item information may include descriptive text, images, or video of the item, price, offers, and the like. The display of the item information may be dynamic based on, for example, the certification results. For example, as described, it may be desirable to organize the search results to prioritize certified items over uncertified items. In some implementations, the item information may be adjusted based on the certification results. For example, if an item is not certified, a threshold price may be specified for the item. In this case, the price of the item may be adjusted to the threshold upon determining the lack of certification. This can create an incentive to ensure an item is associated with sufficient ledger information to meet desired certification levels. The method 500 may terminate at block 590.

Returning to block 512, if ledger records are available for the item, at block 530, the certification authority may determine whether the item complies with a certification rule. The certification authority may receive the item identifier. The item identifier or other property of the item (e.g., name, manufacturer, etc.) may be used to retrieve the certification rule from the certification rules data store. The ledger records for the item may be retrieved from the distributed ledger and compared to the certification rule. If the record type or record value identified in the certification rule is present in the ledger records for the item, the determination at block 530 may be affirmative. In such instance, at block 540, the certification authority may cause the display of the certification information for the certification rule. In some implementations, the certification information may be transmitted to the catalog system that will, in turn, integrate the certification information into a display with the item information at block 580. If at block 530, it is determined that the item does not comply with the certification rule, the method 500 may, optionally, cause display an indication of certification non-compliance. For example, it may be desirable to include an indication on the search results or item detail interface when an item is not organic. The determination may be based upon the failure to identify a distributed ledger record referencing an organic input for an item. The certification authority may directly or indirectly cause display of the non-compliance information contemporaneously with the item information (e.g., description, image, reviews, etc.).

The method 500 may be a computer-implemented method. Under control of one or more computing devices executing specific computer-executable instructions, the computer-implemented method may include storing a distributed electronic ledger for an item. The ledger may include at least one distributed electronic ledger record that identifies a transaction for the item. The computer-implemented method may include receiving a certification rule. The certification rule may be received from a certification device such as an electronic communication device associated with a third-party certification organization. The rule may identify a distributed electronic ledger record type (or record value) needed to certify the item or a property thereof (e.g., BPA free, non-aerosol, from a particular manufacturer, made with genuine materials, sustainably sourced, hormone free, non-GMO, etc.). The rule may also include certification display information to present should the item meet the specified record type or value. When a search request including a criterion identifying the property of the item is received, the catalog system may retrieve item information (e.g., image, description, inventory, etc.) and certification information for the item. The method may include determining that that the distributed electronic ledger for the item includes the at least one distributed electronic ledger record type identified by the certification rule. In such instances, the item information may be displayed along with the certification display information.

Figure 6:
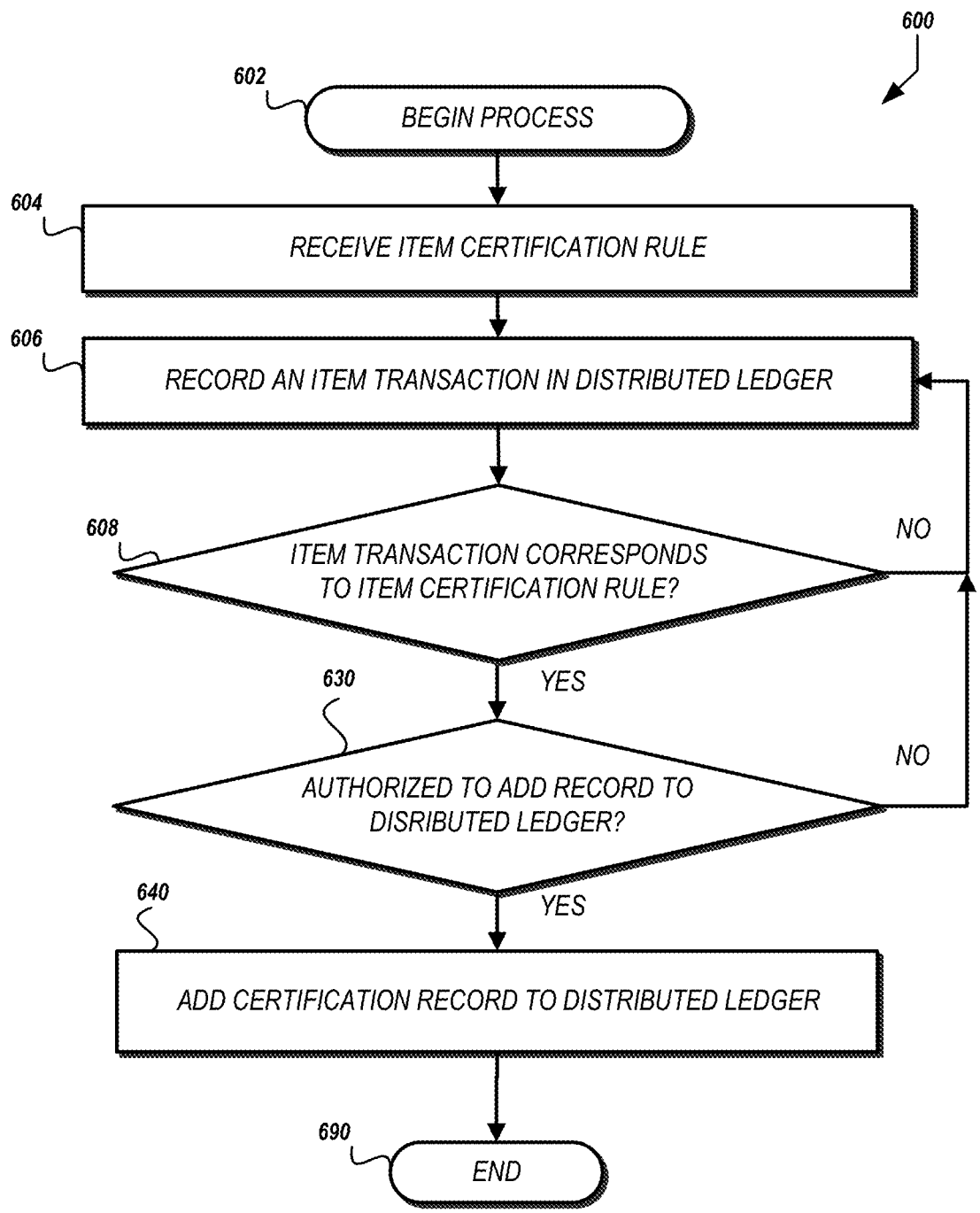
FIG. 6 is a flow diagram depicting another example method of item certification.

FIG. 6 is a flow diagram depicting another example method of item certification. The method 600 may be implemented in whole or in part by the devices described such as the certification authority 125 or the catalog system 150. The method 600 illustrates how certification information may be added to a distributed ledger for an item based at least in part on records included in the distributed ledger for the item.

The method 600 may begin at block 602. At block 604, the certification authority 125 may receive an item certification rule. The receiving at block 604 may be similar to the receiving at block 504 shown in FIG. 5.

At block 606, the certification authority may record item transactions in a distributed ledger. The item transactions may be received from directly or indirectly from a participant in the ledgering system. The item transaction may indicate that a produced item is formed from an input item. In such instances, the ledger records from the input item may be merged or otherwise associated with the produced item. The item ledger records may be organized to facilitate identification of records for certain items.

At block 608, the certification authority 125 may determine whether the item transaction corresponds to the item certification rule received at block 604. The certification authority 125 may monitor the distributed ledger for new item transactions (e.g., item transactions added after a specified date). The monitoring may be continuous or periodic (e.g., once a day, once an hour, etc.). In the event that the certification authority 125 loses connectivity with the distributed ledger, the monitoring may resume at the last processed record (e.g., block) prior to the connectivity loss. This may allow the certification authority 125 to process any transactions added to the ledger while the certification authority 120 was disconnected from the distributed ledger.

The certification authority 125 may compare the item transaction to the certification rule to determine whether to certify the item. For example, if the certification authority 125 is a trade organization, one or more certification rules may be included to assess properties of the item as identified through distributed ledger transactions for the item. The properties may be included in particular record types or specific values within a record. For example, if the certification is that the item is free of hazardous materials, the certification rule may examine the transactions to determine that no records include a predetermined list of hazardous materials. In some implementations, the certification rule may include a dependency. For example, the certification rule may be evaluated only if a precondition (e.g., a different certification, presence of specific record type or value, or elapsed time, time period) is met.

If the determination at block 608 is affirmative, at block 630, the certification authority 125 may determine whether it has permissions to add a certification record to the distributed ledger. For example, because the certifications may provide a statement about a property of the item, it may be desirable to control what parties can add such statements to the distributed ledger. The permissions may be specified through the distributed ledger such that a party adding an entry must be authenticated and authorized prior to accepting the entry.

If the certification authority 125 is authorized to add a record to the ledger, at block 640 the certification authority 125 may add a certification record to the distributed ledger for the item. The certification record may include certification information identified by the certification rule as discussed. For example, a certification information template including a content slot identifying an item value from the distributed electronic ledger may be associated with the certification rule. The record added to the distributed ledger may retrieve values specific to the item for the content slot.

After the certification record is added to the ledger, the method 600 ends at block 690; however, if the determination at either block 608 or block 630 is negative, the certification authority 125 may not add a certification record to the ledger. In such instances, the method 600 may return to block 606 to record another item transaction in the distributed ledger. As this new item transaction may change the determinations at block 608 or 630, the method 600 may re-assess the item's ledger record(s) using the current certification rule(s) as described.

Figure 7:
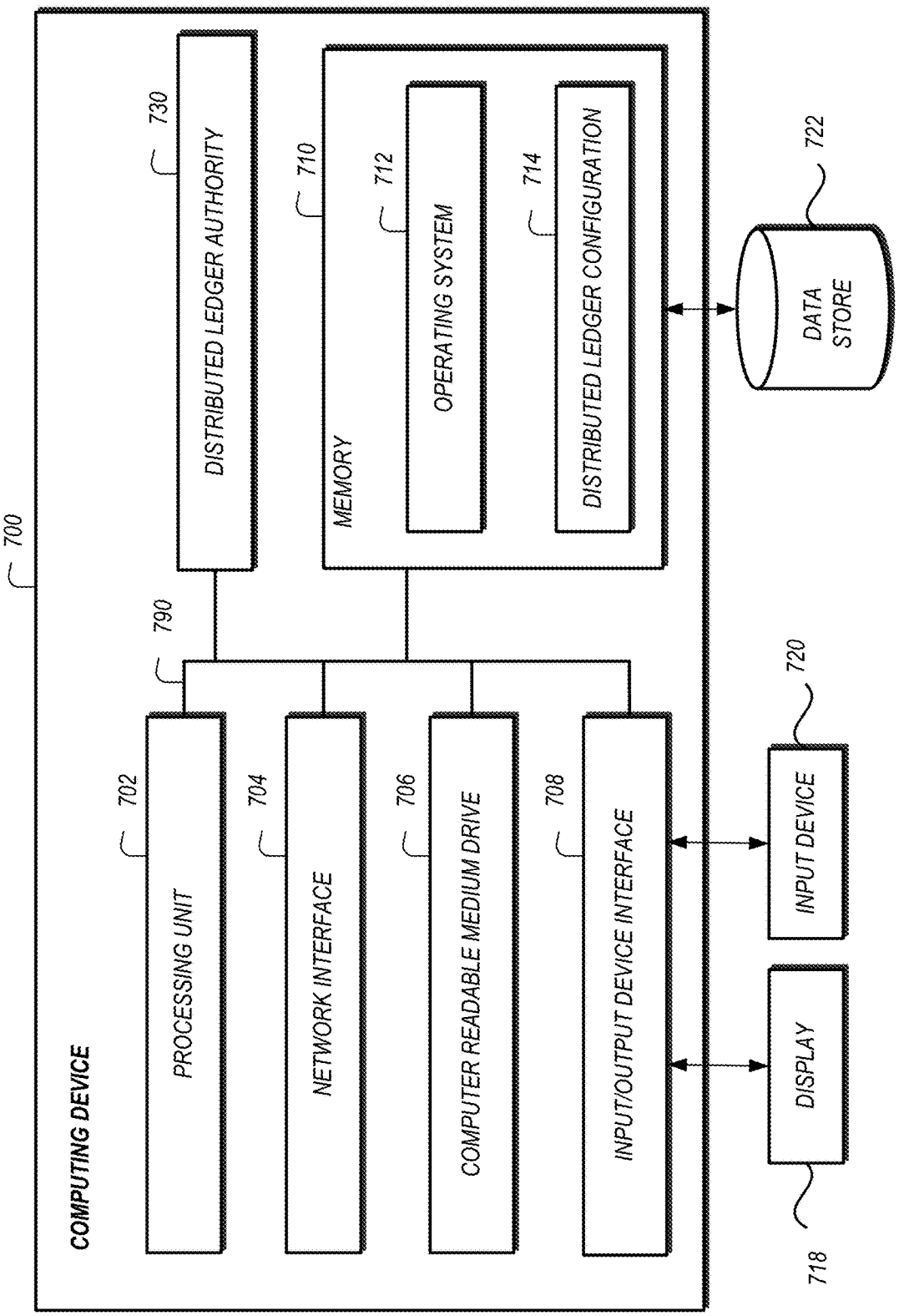
FIG. 7 is a block diagram of an illustrative computing device that may implement one or more of the distributed ledgering features described.

FIG. 7 is a block diagram of an illustrative computing device that may implement one or more of the distributed ledgering features described. The computing device 700 may implement the methods or messaging shown in of FIG. 2A, 2B, 5, or 6. The computing device 700 may provide or receive instructions or information for the interfaces shown in FIG. 3, 4A, or 4B. The computing device 700 can be a server or other computing device, and can comprise a processing unit 702, a distributed ledger authority module 730, a network interface 704, a computer readable medium drive 706, an input/output device interface 708, and a memory 710. The network interface 704 can provide connectivity to one or more networks or computing systems. The processing unit 702 can receive information and instructions from other computing systems or services via the network interface 704. The network interface 704 can also store data directly to memory 710. The processing unit 702 can communicate to and from memory 710 and output information to an optional display 718 via the input/output device interface 708. The input/output device interface 708 can also accept input from the optional input device 720, such as a keyboard, mouse, digital pen, microphone, mass storage device, etc.

The memory 710 contains computer program instructions that the processing unit 702 executes in order to implement one or more embodiments. The memory 710 may include RAM, ROM, and/or other persistent, non-transitory computer readable media. The memory 710 can store an operating system 712 that provides computer program instructions for use by the processing unit 702 or other elements included in the computing device in the general administration and operation of the computing device 700. The memory 710 can further include computer program instructions and other information for implementing aspects of the present disclosure.

For example, in one embodiment, the memory 710 includes a distributed ledger configuration 714. The distributed ledger configuration 714 may include the thresholds, certification rules, participant authentication information (e.g., encryption keys, tokens, etc.), or other predetermined or configurable values described above. The distributed ledger configuration 714 may store specific values for a given configuration. The distributed ledger configuration 714 may, in some implementations, store information for obtaining values for a given configuration element. For example, a certification rule may be specified as a network location (e.g., URL) in conjunction with username and password information to access the network location to obtain the criteria or certification information from a third-party sponsor (e.g., certification group, special interest group, etc.) for the certification rule. The distributed ledger configuration 714 may be used by the distributed ledger authority module 730 to implement one or more of the aspects described herein. In some implementations, the distributed ledger authority module 730 may include specific computer executable instructions that cause the computing device 700 to perform one or more of the distributed ledgering or certification features or interface features described.

The memory 710 may also include or communicate with one or more auxiliary data stores, such as data store 722. The data store 722 may electronically store data regarding the distributed electronic ledger, certification rules, certification results for an item, and the like.

The elements included in the computing device 700 may be coupled by a bus 790. The bus 790 may be a data bus, communication bus, or other bus mechanism to enable the various components of the computing device 700 to exchange information.

In some embodiments, the computing device 700 may include additional or fewer components than are shown in FIG. 7. For example, a computing device 700 may include more than one processing unit 702 and computer readable medium drive 706. In another example, the computing device 702 may not be coupled to the display 718 or the input device 720. In some embodiments, two or more computing devices 700 may together form a computer system for executing features of the present disclosure.

The distributed ledger and certification features described provide a technical solution to several problems facing online and distributed item processing. One problem is trust. Where an item may not be physically presented until after the transaction has occurred, how can a verifiable record of an item's pedigree be provided. The distributed ledgering features described may track participants on a supply chain network to: input and track sourcing of raw materials; record part manufacturing telemetry; track provenance of goods through shipping; maintain immutable records of all aspects of the production and storage of a finished good. This record may not terminate once an item is delivered. The record may continue through to sale and afterwards providing a full life-cycle record for an item.

The features provide digital trust from the first mile of an item's supply chain. Manufacturers may register their items onto a shared open ledger. The system can add authorized high value materials and cryptographically authorized certifications from authority entities. One example of the registration is shown in FIG. 3. The registration process may generate a QR® code that can associate the physical item with its digital record in the distributed ledger. Assume the manufacturer adds the item to a purchase order, and sends the item to a fulfillment center. A mobile application may be provided for the fulfillment center to receive the item and record ownership onto the digital record such as by scanning the QR® code. The distributed ledger may include a record assigning the item to the user from the fulfillment center. Once received, the user may provide information (e.g., scan a picture as in FIG. 4B), to confirm receipt of the item and confirm the transfer of the item. These features can be useful for items like collectibles where it may be important to prove that a user possesses a unique item.

In some implementations, the item history may start when the manufacturer creates the item. From the perspective of the distributed ledger, the item history begins when the item is produced and the manufacturer registers it on the distributed ledger. If need be, the distributed ledger can also be used to verify the provenance of raw materials used to manufacture the item. This would be done using a similar process as used for tracking the provenance of the item itself—the entity sourcing the raw materials may register the materials on the distributed ledger and one or more records of the materials passing through distributors up to the factory is made.

There may be no end to the item's history. The distributed ledger history can be used to prove provenance on the secondhand market when a user decides to transfer the item. Second hand transactions for the item can also be registered on the distributed ledger. Thus, every time the item changes owner, a transaction reflecting that can be recorded on the distributed ledger and associated with the item. Interfaces, alerts, and notifications may be generated based on the item history, along with ownership history, can be presented to the new owner.

The distributed nature of the ledger provides a technical improvement over existing implementations. For example, in traditional databases, data can be altered with little or no trace of such operation. In distributed ledger systems, it is not possible to alter data without altering other nodes participating in the ledgering. Furthermore, traditional databases typically require a central authority that operates the service. This can introduce bottlenecks in the system. This also represents a single point of failure or intrusion. In distributed ledger systems, the ledger is by its nature shared among all participants. An issue with a single node may not impact the ledger as the other nodes can provide verification of any activity of a "rouge" node.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A certification authority can be or include a microprocessor, but in the alternative, the certification authority can be or include a controller, microcontroller, or state machine, combinations of the same, or the like configured to receive, process, and display item data and distributed ledger information for the item. A certification authority can include electrical circuitry configured to process computer-executable instructions. Although described herein primarily with respect to digital technology, a certification authority may also include primarily analog components. For example, some or all of the distributed ledger and certification algorithms described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by a certification authority, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the certification authority such that the certification authority can read information from, and write information to, the storage medium. In the alternative, the storage medium can be integral to the certification authority. The certification authority and the storage medium can reside in an application specific integrated circuit (ASIC). The ASIC can reside in an access device or other certification or distributed ledgering device. In the alternative, the certification authority and the storage medium can reside as discrete components in an access device or other certification or ledgering device. In some implementations, the method may be a computer-implemented method performed under the control of a computing device, such as an access device or other certification or distributed ledgering device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer-implemented method for certifying a distributed electronic ledger, the computer-implemented method comprising:
   under control of one or more computing devices executing specific computer-executable instructions,
      storing, in at least two data storage devices, a distributed electronic ledger for an item, the distributed electronic ledger including at least one distributed electronic ledger record identifying a transaction for the item forming a verifiable history for the item;
      receiving, from a certification device, a certification rule identifying at least one distributed electronic ledger record type to certify a property of the item, wherein the certification rule specifies compliance with a certification criterion;
      determining that the distributed electronic ledger for the item includes the at least one distributed electronic ledger record type identified by the certification rule;
      generating certification information for the item based at least in part on the distributed electronic ledger record for the item and the certification criterion; and
      adding a distributed electronic ledger record for the item to the distributed electronic ledger, the distributed electronic ledger record including certification information for the item.

2. The computer-implemented method of claim 1, wherein the certification rule further identifies at least one distributed electronic ledger record value to certify the property of the item, and wherein the computer-implemented method further comprises determining the distributed electronic ledger for the item includes at least one distributed electronic ledger record that includes the at least one distributed electronic ledger record value.

3. The computer-implemented method of claim 1, further comprising:
   receiving, from a first entity, transaction information indicating that the item is formed from a first input item and a second input item, wherein the first input item is associated with a first distributed electronic ledger and the second input item is associated with a second distributed electronic ledger;
   determining that first permissions of the first distributed electronic ledger allow the first entity to edit the first distributed electronic ledger;
   determining that second permissions of the second distributed electronic ledger allow the first entity to edit the second distributed electronic ledger; and
   generating the distributed electronic ledger for the item based at least in part on the first distributed ledger and the second distributed ledger.

4. The computer-implemented method of claim 1, further comprising determining that the distributed electronic ledger does not include a ledger record revoking the at least one distributed electronic ledger record type identified by the certification rule.

5. The computer-implemented method of claim 1, further comprising:
   receiving an indexing rule for the distributed electronic ledger, the indexing rule identifying at least one of:
      i) a distributed electronic ledger record type, or
      ii) a distributed electronic ledger record value; and
   generating an index of the distributed electronic ledger stored by the at least two data storage devices, wherein generating the index is based at least in part on the indexing rule, the index identifying storage locations for the distributed electronic ledger including the distributed electronic ledger record type or the distributed electronic ledger record value identified by the indexing rule.

6. The computer-implemented method of claim 1, wherein the certification rule comprises a certification information template including a content slot identifying an item value from the distributed electronic ledger, and wherein the computer-implemented method further comprises:
   identifying a distributed electronic ledger record for the item including the item value; and
   generating the certification information based at least in part on the certification information template and the distributed electronic ledger record for the item.

7. The computer-implemented method of claim 1, further comprising:
   receiving, from a user device, a representation of an item identifier included on the item or packaging thereof and a user identifier for a user;
   determining that the distributed electronic ledger includes a record indicating transfer of the item associated with the item identifier from a first entity to the user associated with the user identifier; and
   adding a transfer record for the item to the distributed electronic ledger indicating receipt of the item by the user associated with the user identifier.

8. The computer-implemented method of claim 7, the computer-implemented method further comprising:
receiving, from the first entity, a notification message, the notification message identifying the item;
retrieving the user identifier from the distributed electronic ledger based at least in part on the item identifier of the item;
retrieving, from a user data store, contact information for the user, the contact information including an identifier for the user device; and
transmitting the notification message to the user device based at least in part on the identifier for the user device.

9. The computer-implemented method of claim 1, the computer-implemented method further comprising:
receiving, from a user device, a request to present information about the item; and
causing presentation of the certification information with information about the item.

10. A computer system comprising:
a computer-readable memory storing executable instructions; and
one or more computer processors in communication with the computer-readable memory, wherein the one or more computer processors are configured to execute the executable instructions to at least:
store, in at least two data storage devices, a distributed electronic ledger for an item, the distributed electronic ledger including at least one distributed electronic ledger record identifying a transaction for the item forming a verifiable history of the item;
receive, from a certification device, a certification rule identifying at least one distributed electronic ledger record type to certify a property of the item, wherein the certification rule specifies compliance with a certification criterion;
determine that the distributed electronic ledger for the item includes the at least one distributed electronic ledger record type identified by the certification rule;
generate certification information for the item based at least in part on the distributed electronic ledger record for the item and the certification criterion; and
add a distributed electronic ledger record for the item to the distributed electronic ledger, the distributed electronic ledger record including certification information for the item.

11. The system of claim 10, wherein the certification rule further identifies at least one distributed electronic ledger record value to certify the property of the item, and wherein the one or more computer processors are further configured to execute the executable instructions to at least determine the distributed electronic ledger for the item includes at least one distributed electronic ledger record that includes the at least one distributed electronic ledger record value.

12. The system of claim 10, wherein the one or more computer processors are further configured to execute the executable instructions to at least:
receive, from a first entity, transaction information indicating that the item is formed from a first input item and a second input item, wherein the first input item is associated with a first distributed electronic ledger and the second input item is associated with a second distributed electronic ledger;
determine that first permissions of the first distributed electronic ledger allow the first entity to edit the first distributed electronic ledger;
determine that second permissions of the second distributed electronic ledger allow the first entity to edit the second distributed electronic ledger; and
generate the distributed electronic ledger for the item based at least in part on the first distributed ledger and the second distributed ledger.

13. The system of claim 10, wherein the one or more computer processors are further configured to execute the executable instructions to at least:
receive a ledger record for the item, the ledger record revoking the at least one distributed electronic ledger record identified by the certification rule; and
transmit a message to the user device indicating a change in certification for the item.

14. The system of claim 10, wherein the one or more computer processors are further configured to execute the executable instructions to at least:
receive an indexing rule for the distributed electronic ledger, the indexing rule identifying at least one of:
i) a distributed electronic ledger record type, or
ii) a distributed electronic ledger record value; and
generate an index of the distributed electronic ledger stored by the at least two data storage devices, wherein generating the index is based at least in part on the indexing rule, the index identifying storage locations for the distributed electronic ledger including the distributed electronic ledger record type or the distributed electronic ledger record value identified by the indexing rule.

15. The system of claim 10, wherein the certification rule comprises a certification information template including a content slot identifying an item value from the distributed electronic ledger, and wherein the one or more computer processors are further configured to execute the executable instructions to at least:
identify a distributed electronic ledger record for the item including the item value; and
generate the certification information based at least in part on the certification information template and the distributed electronic ledger record for the item.

16. The computer-implemented method of claim 15, wherein the one or more computer processors are further configured to execute the executable instructions to at least:
receive, from the first entity, a notification message, the notification message identifying the item;
retrieve a user identifier from the distributed electronic ledger based at least in part on the item identifier of the item, the user identifier indicating a user associated with the item;
retrieve, from a user data store, contact information for the user, the contact information including an identifier for the user device; and
transmit the notification message to the user device based at least in part on the identifier for the user device.

* * * * *

UNITED STATES PATENT AND TRADEMARK OFFICE
CERTIFICATE OF CORRECTION

PATENT NO. : 10,664,797 B2  
APPLICATION NO. : 15/653948  
DATED : May 26, 2020  
INVENTOR(S) : Gregory Louis Chappell Page 1 of 1

It is certified that error appears in the above-identified patent and that said Letters Patent is hereby corrected as shown below:

In the Drawings

Drawing Sheet 8 of 9, FIG. 6, Reference Number 630, Line 2, delete "DISRIBUTED" and insert --DISTRIBUTED--.

In the Specification

Column 16, Line 48, delete "FIG." and insert --FIGS.--.

Column 16, Line 51, delete "FIG." and insert --FIGS.--.

Column 16, Line 54, delete "computer readable" and insert --computer-readable--.

Column 17, Line 34, delete "computer executable" and insert --computer-executable--.

In the Claims

Column 24, Line 47, Claim 16, delete "The computer-implemented method of claim" and insert --The system of claim--.

Signed and Sealed this  
Twenty-eighth Day of July, 2020

Andrei Iancu  
*Director of the United States Patent and Trademark Office*